United States Patent
Wübbels

(10) Patent No.: US 7,036,296 B2
(45) Date of Patent: May 2, 2006

(54) VARIABLE SPEED DRIVE FOR OBLIQUE FEEDING DRUMS

(75) Inventor: Richard Wübbels, Rhede (DE)

(73) Assignee: Maschinenfabrik Kemper GmbH & Co KG, Stadtlohn (DE)

( * ) Notice: Subject to any disclaimer, the term of this patent is extended or adjusted under 35 U.S.C. 154(b) by 0 days.

(21) Appl. No.: 11/039,754

(22) Filed: Jan. 20, 2005

(65) Prior Publication Data
US 2005/0193705 A1 Sep. 8, 2005

(30) Foreign Application Priority Data
Feb. 20, 2004 (DE) .................. 10 2004 008 340

(51) Int. Cl.
*A01D 69/00* (2006.01)
(52) U.S. Cl. .................................... 56/10.8
(58) Field of Classification Search .............. 56/10.8, 56/11.2, 11.1, 10.9, 14.5
See application file for complete search history.

(56) References Cited

U.S. PATENT DOCUMENTS

| | | | |
|---|---|---|---|
| 4,138,837 A * | 2/1979 | Love .......................... 56/11.2 |
| 5,462,486 A * | 10/1995 | Norton .......................... 460/20 |
| 5,527,218 A * | 6/1996 | Van den Bossche et al. . 460/20 |
| 5,778,644 A * | 7/1998 | Keller et al. .................. 56/11.2 |
| 5,791,128 A * | 8/1998 | Rogalsky ..................... 56/14.5 |
| 6,073,428 A * | 6/2000 | Diekhans ................. 56/10.2 R |
| 6,247,296 B1 * | 6/2001 | Becker et al. ............... 56/11.2 |
| 6,393,813 B1 * | 5/2002 | Nowak ..................... 56/10.2 J |

FOREIGN PATENT DOCUMENTS

| | | |
|---|---|---|
| DE | 199 51 636 | 10/1999 |
| EP | 0 760 200 | 6/1996 |
| EP | 1 055 359 | 5/2000 |
| EP | 1 338 191 | 2/2003 |
| WO | WO 99/48353 | 3/1999 |
| WO | WO 02/056672 | 1/2002 |

* cited by examiner

*Primary Examiner*—Árpád Fábián Kovács

(57) ABSTRACT

A forage harvester header is coupled to a forage harvester and is equipped with at least one mower and intake drive assembly for cutting crop and transporting the cut crop to a discharge conveyor which delivers the crop to a feed channel of the forage harvester. The drive arrangement for the header is such that the velocity of the discharge conveyor can be varied relative to the velocity of the mower and intake drive assembly.

1 Claim, 3 Drawing Sheets

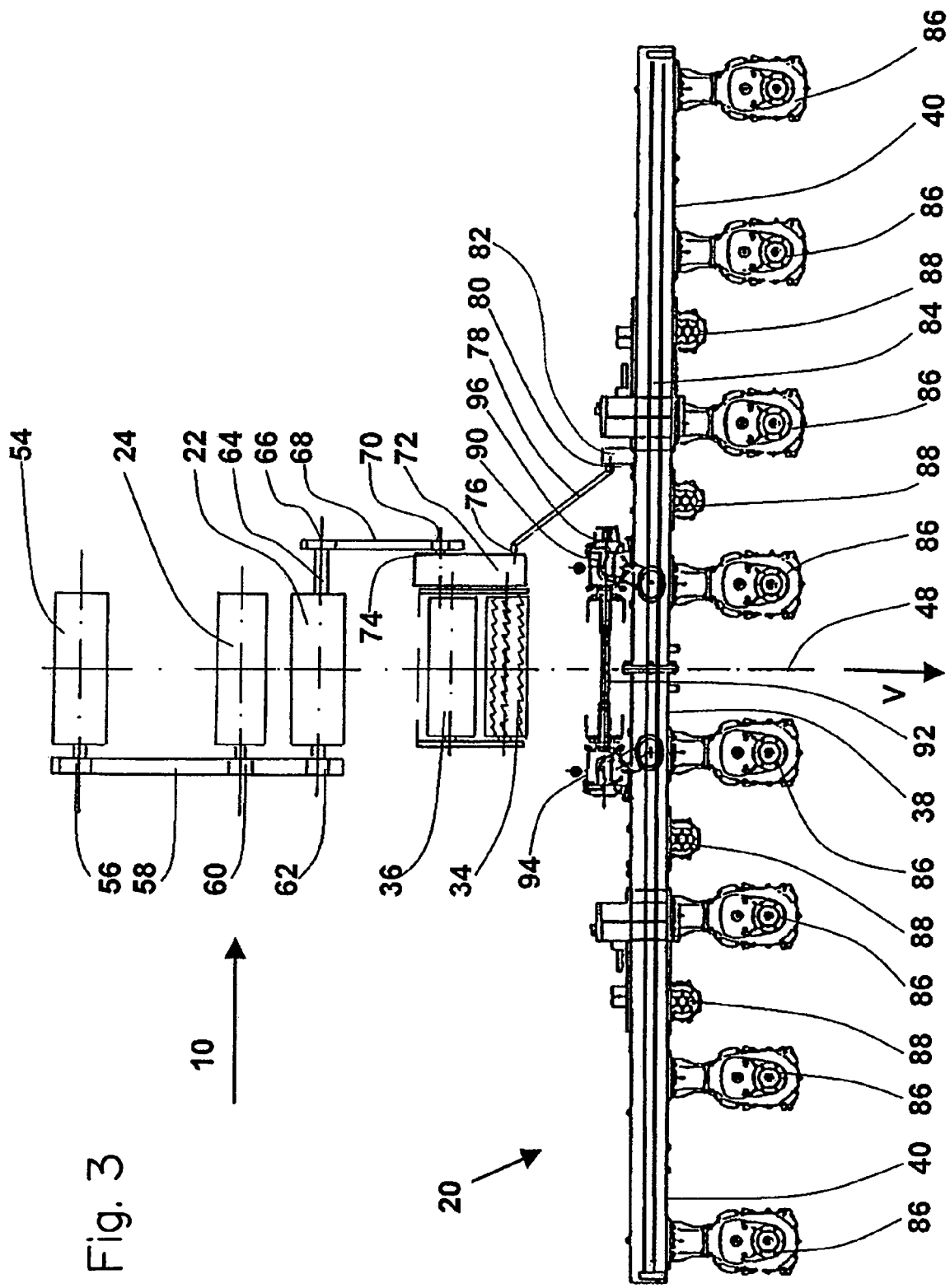

VARIABLE SPEED DRIVE FOR OBLIQUE FEEDING DRUMS

FIELD OF THE INVENTION

The invention concerns a header attachable to a forage harvester for mowing crops to be harvested, which crops have having stalks, and with at least one mower and intake drive assembly for the mowing and transporting away of harvested crop and a discharge conveyer to which harvested crop can be conducted from the mower and intake drive assembly and that is arranged to conduct the crop to the intake channel of the forage harvester, where the speed of the discharge conveyor can be varied relative to the speed of the mower and intake drive assembly.

BACKGROUND OF THE INVENTION

Headers for mowing crops having stalks so as to be harvested are used in combination with self-propelled, towed or attached forage harvesters for the total plant harvest, for example, for the harvest of silage corn. A commonly used type of such a header is described in EP 0 760 200A. The header of this publication includes a number of mower and intake drive assemblies arranged alongside each other for the mowing and transporting away of the plants along whose rear side the harvested crop is conducted to the center of the header. There it is conveyed to the rear into the intake channel of the forage harvester by means of discharge conveyors in the form of so-called slope conveyor drums which rotate about generally vertical axes which, however are inclined slightly in the forward direction, where the crop is compressed by rough pressing rolls and conducted to a chopper drum. The latter chops the harvested crop and conducts it to a blower that conveys the harvested crop from the forage harvester to a transport vehicle. The mower and intake drive assemblies and the discharge conveyors are connected with an output drive of the forage harvester over gearboxes with fixed speed ratios.

for a variation of the length of cut, the usual practice is to vary the rotational speed of the rough pressing rolls of the forage harvester, that can be performed by means of shifted gearboxes, adjustable hydraulic drives (for example, see WO 02/056672 A) or combined mechanical-hydraulic drives (WO 99/48353 A). At that point, the rotational speed of the chop[per drum remains approximately constant, so that the length of cut is inversely proportional to the rotational speed and the velocity of the rough pressing rolls.

At the present time, a trend towards longer lengths of cut can be observed. The longer lengths of cut require a relatively high velocity for the rough pressing rolls. In order to avoid problems in the transport during the transition of the plants from the discharge conveyor of the header to the rough pressing rolls of the forage harvester, caused by difference in speed, there is the possibility of also operating al driven elements of the header at higher rotational speeds. For this purpose, multi-speed shifted gearboxes are used. It has also been proposed that the front harvesting attachment be driven at a speed proportional to the rotational speed of the rough pressing rolls (WO 99/48353 A). The disadvantage in a variation of the rotational speeds of all driven elements of the header is seen in the fact that the rotational speeds of the mower and intake drive assemblies are also increased, although that speed increase does not bring about any improvement in the conveying of the harvested crop and hence is not necessary. It increases the power requirement of the drive and results in increased wear of the cutting knives and the braking arrangements of the header.

WO 02/056672 A describes a forage harvester with a header for mowing crops to be harvested, in which the slope conveyor drums are driven at a speed that is independent of the speed of the mower and intake drive assemblies. For this purpose, the rough pressing rolls and the slope conveyor drums are driven together by a first hydraulic motor while the remaining driven elements of the header are driven by a second hydraulic motor. Here the disadvantage is seen in the fact that two drive connections must be provided between the forage harvester and the header, that is, between the slope conveyor drums and the first hydraulic motor as well as between the remaining driven elements of the header and the second hydraulic motor. Thereby, the attachment and removal of the header to or from the forage harvester is rather time consuming. Furthermore, the efficiency of the hydraulic rives is relatively poor.

EP 1 055 359 A proposes that a transverse screw conveyor or transverse conveyor bands of a cutter head for a combine be driven hydraulically at an adjustable speed, while the beam of the cutter head is driven mechanically. The reel is driven hydraulically, at a fixed rotational speed. Here, too, a number of hydraulic drives with limited efficiency are provided.

The problem underlying the invention is seen in the need to make available a machine for harvesting crops having stalks that is improved over the aforementioned state of the art in which the velocity of the discharge conveyor is made to conform to the rotational speed of the rough pressing rolls of the forage harvester.

SUMMARY OF THE INVENTION

According to the present invention, there is provided an improved drive for parts of a forage harvester header.

An object of the invention is to provide a drive for parts of a forage harvester header wherein the rotational speed of the discharge conveyor is variable.

In this way, the velocity of the discharge conveyor can be made to conform to the velocity of the rough pressing rolls by a variation in the speed ration of the gearbox without great cost. The speed of the mower and intake drive assembly is not changed, thereby unnecessary wear and higher drive power demand of the mower and intake drive assembly is no longer required. The discharge conveyor, in particular, is a slope conveyor drum that rotates about a generally vertical axis inclined slightly in the forward direction, in order to overcome the differences in height between the header and the forage harvester, or it is a transverse screw conveyor.

With the use of a gearbox with variable transmission ration, it is sufficient to establish a single drive connection between the machine and the forage harvester. This drive connection drives a shaft that drives the mower and intake drive assembly as well as the discharge conveyor. Moreover, there is the possibility of equipping the machine with several shafts that are driven by separate drive connections from the forage harvester, each of which drives one or more mower and intake drive assembly and in each case drives a discharge conveyor through a gearbox with variable transmission ratio. In other embodiments, it would also be conceivable that the gearbox with variable transmission ration be driven by the forage harvester separate from the drive of the mower and intake drive assemblies.

Preferably, the mower and intake drive assembly is driven by a completely mechanical drive-line from an internal combustion engine used as the main drive power of the forage harvester, that is, avoiding hydraulic drive components that are subject to power losses. Thereby, the result is a rotational speed of the mower and intake drive assembly that is proportional to the rotational speed of the internal combustion engine. Since the latter is usually constant, the rotational speed of the mower and intake drive assembly also remains constant.

The gearbox with variable transmission ration is seen primarily in the form of a mechanical gearbox, for example as shifted gearbox, in which various speed rations can be selected, in which a selection is made which pair of meshing gears from among a series of such meshing gears ins inserted into the drive-line. Alternatively, a gearbox that is operated as continuously variable without steps can be used, such as a variable speed belt drive. A hydraulic drive could also be used with a pump and a motor.

BRIEF DESCRIPTION OF THE DRAWINGS

The drawings show an embodiment of the invention that is described in further detail in the following.

FIG. 3 shows a plan view of the drive-line of the forage harvester and header.

DESCRIPTION OF THE PREFERRED EMBODIMENT

Figure 1:
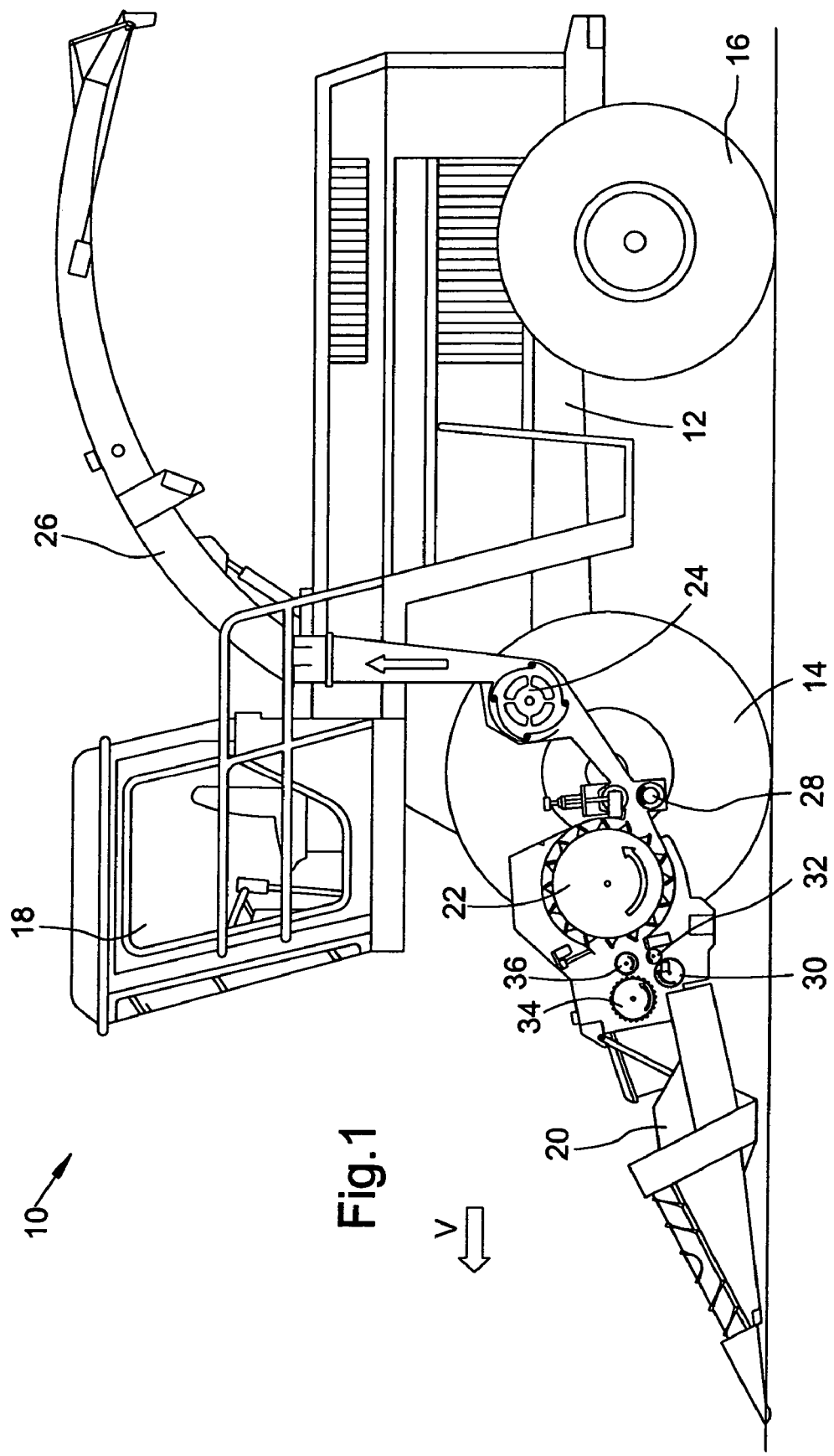
FIG. 1 shows a schematic side view of a forage harvester with a header for mowing crops having stalks being harvested.

A self-propelled forage harvester 10, as shown in FIG. 1, is supported on a frame 12 that is carried by driven front wheels and steerable rear wheels 14 and 16. The forage harvester 10 is controlled from an operator's cab 18 from which a header 20 for mowing crops to be harvested can be viewed. Crop taken up from the ground by means of the header 20, for example, corn, grass or the like is conducted to a chopper drum 22 by lower rough pressing rolls 30, 32 and upper rough pressing rolls 34, 36 arranged in an intake channel of the harvesting machine 10. The chopper drum 22 chops the crop into small pieces and delivers it to a conveyor arrangement 24. As a rule, the upper rough pressing rolls 34, 36 are arranged so that they can move relative to the lower intake rolls 30,32 and are forced against the latter by spring force. The crop leaves the harvesting machine 10 to an accompanying trailer over a duct 26 mounted for being selectively rotated about an upright axis. A post chopper reduction arrangement 28 is arranged between the chopper drum 22 and the conveyor arrangement 24 through which crop to be conveyed is conducted tangentially to the conveyor arrangement 24, the post chopper reduction arrangement 28 is composed of two processing rolls arranged one above the other.

Figure 2:
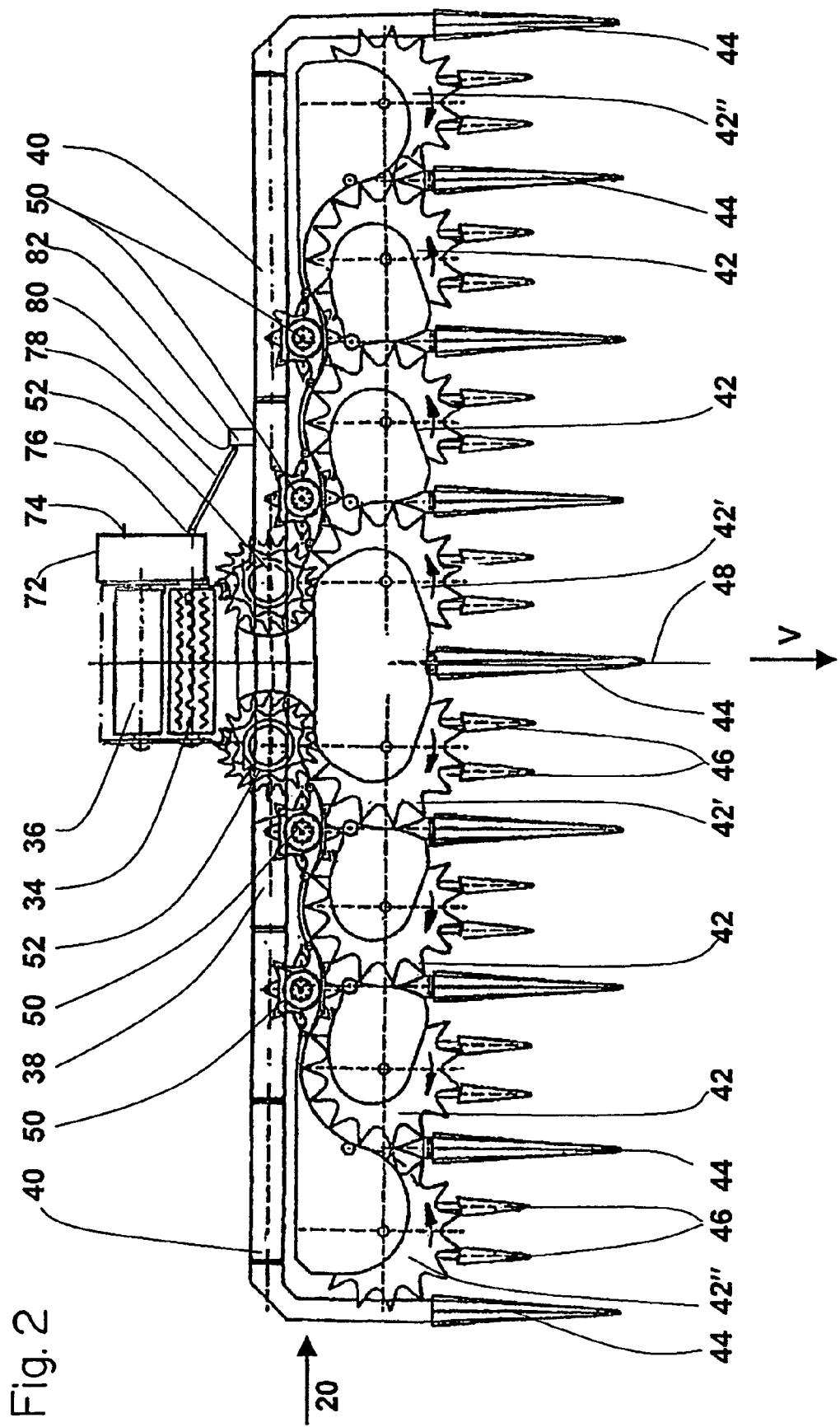
FIG. 2 shows a plan view of the header and the rough pressing rolls of the forage harvester.

FIG. 2 is a plan view of the header 20 in which the rough pressing rolls 34, 36 are also shown schematically. Te header 20 is provided with a transverse support carrier that is composed of a central segment 38 connected with the intake channel of the forage harvester 10 and tow outer segments 40 that can be pivoted upward for transport on public roads by a hydraulic cylinder about an axis extending parallel to the forward operating direction V. Eight mower and intake drive assemblies 42 are supported side-by-side alongside each other on the transverse carrier. Any desired other quantity of mower and intake drive assemblies 42 could also be used. The mower and intake drive assemblies 42 are provided with lower cutter disks and conveyor disks arranged above the lower cutter disks and include recesses distributed about their circumference which engage plant stalks. These are preceded by larger stalk dividers 44 and smaller stalk dividers 46 arranged between them.

Transverse conveyor drums 50 are located on the rear side of the gore regions between adjoining mower and intake drive assemblies 42 (except for the region between the mower and intake drive assemblies 42' which is bisected by the longitudinal center plane 48, and the region between each of the outer intake and drive assemblies 42" and the adjacent drive assembly 42). Each of the outer mower and intake drive assemblies 42 rotates in the opposite direction from the three mower and intake drive assemblies 42, 42 and 42" following inward from each drive assembly 42", so that transverse conveyor drums 50 can be omitted downstream of the outer mower and intake drive assemblies 42". Discharge conveyors 52 are located on the rear sides of the mower and intake drive assemblies 42' adjoining the longitudinal center plane 48, the discharge conveyors being configured in the form of so-called slop conveyor drums with approximately vertical axes of rotation inclined slightly in the forward direction, these are used to overcome the difference in height between the floor of the header 20 and the intake channel of the forage harvester 10.

During harvester operation, the mower and intake drive assemblies 42, 42' and 42" rotate in the directions indicated by the arrows and separate the crop to be harvested from the ground by means of their cutter disks and engage the crop in the recesses of their conveyor disks. The crop is then transported in the direction of the longitudinal center plane 48 of the header 20 along their rear sides by the transverse conveyor drum 50 interacting with the rear sides of the mower and intake drive assemblies 42, 42' and 42". Then the crop is taken over by the discharge conveyors 52 that convey the crop at first in the direction towards the longitudinal center plane 48 and then to the rear and upward into the intake channel of the forage harvester 10. Since the header shown here and its operation has been described in greater detail, for example, in EP 0 760 200 A, whose disclosure is incorporated into the present document by reference, further explanation of the operation is omitted here.

FIG. 3 shows the drive-line of the header 20 and of the forage harvester 10. An internal combustion engine 54 drives a belt 58 by means of a belt pulley 56, the belt interacts with a belt pulley 60 that drives the conveyor arrangement 24 and a conveyor disk 62, which drives the chopper drum 22. The chopper drum 22 in turn drives a shaft 64 which drives a belt pulley 66. The belt pulley 66 is connected so as to drive a belt pulley 70 by means of a belt 68, the belt pulley 70 drives the input shaft 74 of a length of cut gearbox 72. Alternatively, a drive connection with gears is provided between the chopper drum 22 and the length of cut gear box 72.

The length of cut gear box 72 contains drive elements that drive the rough pressing rolls 30–36. The rotational speed of the rough pressing rolls 30–36 can be varied continuously or in steps by the length of cut gearbox 72. Preferably, a length of cut gearbox is applied here, such as is described by WO 99/48353 A, that is it contains a planetary gear set which is provided with mechanically and hydraulically driven elements, in order to make available the rotational speed of the rough pressing rolls 30–36 primarily mechanically and in order to be able to vary the speed hydraulically. However, a purely hydraulic drive of the rough pressing rolls 30–36 is conceivable.

The length of cut gear box 72 transmits the drive energy from the internal combustion engine 54 purely mechanically to the stub shaft 76 to which a removable articulated shaft 78 of variable or fixed length is fastened. Here, a rotational speed transmission can be performed. The articulated shaft 78 extends from the stub shaft 76 of the length of cut gearbox 72 to a stub shaft 80 of an input gearbox 82 of the header 20. The input gearbox 82 is connected so as to drive by means of gears and/or chains, not shown, with a transverse shaft 84 which is located within the segments 38, 40 of the transverse carrier and that extends generally over the entire width of the header 20. In the transition region to the segments 40 that can be folded upward, appropriate clutches (not shown) are provided in the transverse shaft 84. The transverse shaft 84 drives by means of bevel gears (not shown) or the like eight gearboxes 86, each of which is associated with a mower and intake drive assembly 42. The transverse shaft 84 is connected so as to drive the transverse conveyor drums 50 by means of four further, smaller gearboxes 88. Finally, the transverse shaft 84 drives a shift gearbox 90, that is configured as a shift gearbox with a variable transmission ratio. ON its output side, the shift gearbox 90 drives the discharge conveyor 52, shown at the right in FIG. 2, and a shaft 92, which in turn drives a further gearbox 94 that again in turn drives the discharge conveyor 52, shown at the left in FIG. 2. An actuator 96, that can be remotely controlled electrically or hydraulically by an operator in the operator's cab 18, permits a change in the speed transmission of the shift gearbox 90. In a possible embodiment, a two-step gearbox 90 permits a variation in the rotational speed of the discharge conveyors 52 by approximately 10%. The shift gearbox 90 may be a mechanical gearbox that is provided with two or more pairs of meshing gears of differing diameter. In each case, one of the pair of gears is brought into driving connection with a shaft by a movable coupling member.

In other embodiments, two transverse shafts 84 are provided, each of which extends approximately to the longitudinal center plane 48 and are driven by associated articulated shafts 78 from both sides of the intake channel. Then, the drive of the gearbox 94 can be performed, as shown in the drawing, or from the transverse shaft 84 of the left half of the header 20, as shown by FIG. 3; then, it must also be configured as a shift gearbox 90 and the shaft 92 can be omitted. In place of the relatively small mower and intake drive assemblies 42, 42' and 42" shown, whose diameter amounts to approximately 75 cm., larger mower and intake drive drums could also be used. An endless conveyor could also be applied here, as described in DE 199 51 636 A.

The length of cut gearbox 72 permits a variation in the rotational speed of the rough pressing rolls 30–36 within a certain range of the length of cut. The rotational speed of the mower and intake drive assemblies 42, 42' and 42", and the transverse conveyor drums 50 that are driven by the internal combustion engine 54 over the purely mechanical drive line, as described, is independent of the rotational speed of the rough pressing rolls 30–36 at a constant rotational speed of the internal combustion engine 54. This speed is selected in such a way that a safe cut of the stalk crop to be harvested, particularly corn, and a trouble-free transport of the harvested crop to the discharge conveyor 52 can be assured. At larger lengths of cut that correspond to higher rotational speeds of the rough pressing rolls 30–36, the speed of the discharge conveyors 52 can be increased by means of the shift gearbox 90, which improves the transport of the harvested crop in this region. In case that smaller lengths of cut are demanded, the rotational speed of the discharge conveyor 52 can again be reduced analogously.

During reverse operation, that can be performed by means of a reversing motor of the length of cut gearbox 72, or a hydraulic motor at that location used to change the length of cut, the driven elements of the header 20 rotate in the opposite direction.

Having described the preferred embodiment, it will become apparent that various modifications can be made without departing from the scope of the invention as defined in the accompanying claims.

The invention claimed is:

1. In a forage harvester including a crop intake channel, an engine, length of cut gear box, a train of drive elements coupled between the engine and said length of cut gearbox, a crop harvesting header being mounted to said forage harvester and including a drive input gearbox, at least one mower and intake drive assembly for cutting off and transporting harvested crop, and a discharge conveyor located for receiving cut crop from said at least one mower and intake drive assembly and for delivering the crop to said intake channel of the forage harvester; an articulated drive shaft being coupled between said length of cut gearbox and said drive input gearbox, the improvement comprising: a drive shaft being coupled between said drive input gearbox and said at least one mower and intake drive assembly; and a mechanical shift gearbox with a variable transmission ratio being coupled for being driven by said drive input gearbox and being coupled for driving said discharge conveyor.

* * * * *